United States Patent [19]

Mark

[11] Patent Number: 4,968,200
[45] Date of Patent: Nov. 6, 1990

[54] EXPANSION ANCHOR ASSEMBLY

[75] Inventor: Fritz Mark, Mäder, Austria

[73] Assignee: Hilti Aktiengesellschaft

[21] Appl. No.: 422,786

[22] Filed: Oct. 17, 1989

[30] Foreign Application Priority Data

Oct. 17, 1988 [DE] Fed. Rep. of Germany ....... 3835300

[51] Int. Cl.$^5$ ............................................. F16B 13/06
[52] U.S. Cl. ......................................... 411/55; 411/60; 411/68
[58] Field of Search ..................... 411/55, 57, 60, 61, 411/63, 64, 65, 68, 43, 38

[56] References Cited

U.S. PATENT DOCUMENTS

| 4,636,123 | 1/1987 | Herb | 411/55 |
| 4,656,806 | 4/1987 | Leibhard et al. | 411/55 |
| 4,865,246 | 9/1989 | Miyanaga | 411/60 |

FOREIGN PATENT DOCUMENTS 715831  2/1980  U.S.S.R. .................................. 411/38

Primary Examiner—Neill R. Wilson
Attorney, Agent, or Firm—Toren, McGeady & Associates

[57] ABSTRACT

An expansion anchor assembly is made up of an expansion sleeve and an anchor rod. At one end, the expansion sleeve has a plurality of separate expansion parts radially deflectable about bending locations, by drawing an expansion cone on one end of the anchor rod into engagement with the expansion parts. Expansion parts can be displaced radially outwardly into a conically widened undercut in a borehole. To achieve surface area contact with the undercut, when the expansion parts are deflected outwardly, the radially inner and outer surfaces of the expansion parts are provided with a radius of curvature increasing from the bending locations to the free ends of the expansion parts.

9 Claims, 2 Drawing Sheets

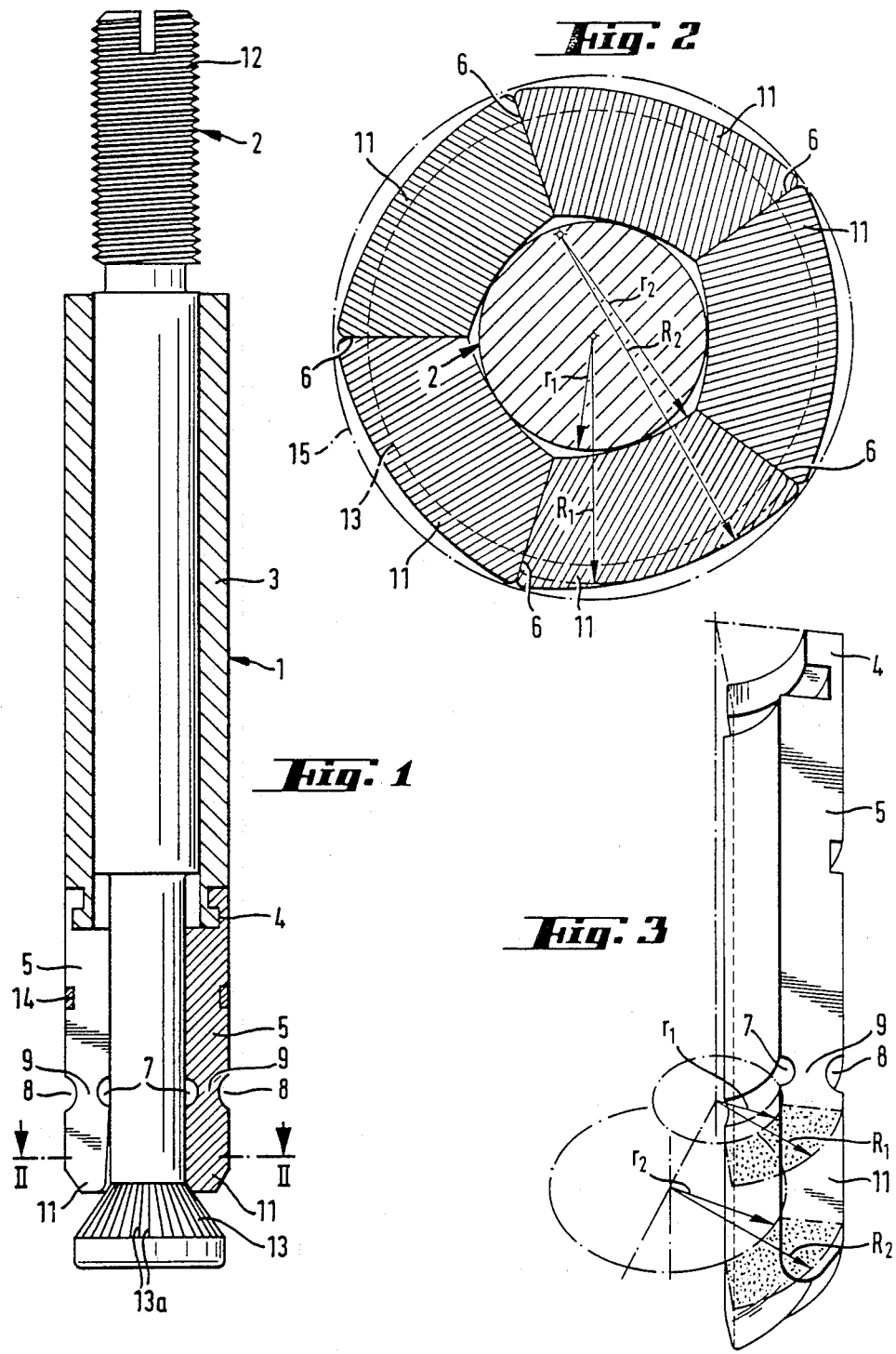

EXPANSION ANCHOR ASSEMBLY

BACKGROUND OF THE INVENTION

The present invention is directed to an expansion anchor assembly to be secured in a borehole. The assembly is made up of an axially extending expansion sleeve and an axially extending anchor rod. One end of the expansion sleeve is formed by a plurality of shell-shaped expansion parts separated by axially extending slots. The expansion parts can be deflected radially outwardly by drawing an expansion cone on one end of the anchor rod into the expansion sleeve so that the expansion parts are displaced around bending locations.

An expansion anchor assembly to be fastened in a borehole with a conically widened undercut is disclosed in U.S. Pat. No. 4,519,735. The assembly includes an expansion sleeve with shell-shaped expansion sections and an anchor rod with an expansion cone. The expansion sections are deflected radially by drawing the expansion cone into the expansion sleeve and displacing the expansion section into a positive-locking engagement. In such an expansion anchor assembly, the expansion sections are displaced around a weakened section connecting the sections with the adjacent portion of the expansion sleeve.

The inner and outer surfaces of the expansion anchor assembly are cylindrically shaped, that is, they have a constant radius of curvature. The inside radius of curvature of the expansion section corresponds to the radius of curvature of the expansion sleeve opening adjacent to the expansion sections. Similarly, the outside radius of curvature corresponds to the radius of curvature of the cylindrical outer surface of the expansion sleeve.

When the expansion cone is drawn into the sleeve, it is centrally located between the expansion sections with the radius of curvature increasing toward the free end, whereby the inner surface of the expansion sections is radially supported on the expansion cone only along axially extending edges spaced apart in the circumferential direction due to the constant radius of curvature. As a result, the surface of the expansion sections has a concave shape with respect in the expansion cone. In a like manner, the expansion sections only contact the conical surface of the undercut with line contact, because the expansion sections have a constant radius of curvature on the outside, while the radius of curvature of the widened undercut increases toward the base of the borehole. Consequently, the expansion sections contact the undercut conical surface along an axially extending line.

Very high specific compressive stresses develop between the expansion sections and the expansion cone and the wall of the widened undercut, during the loading of the expansion anchor assembly, since the inner and outer contact of the expansion sections is only a line contact. In particular, such contact can lead to overstressing the line contact locations in the undercut supporting the expansion sections, and, accordingly, to impairment of the anchorage. It is not possible to obtain a surface area contact between the expansion sections and the undercut surface after the radial deflection of the sections, since excessive forces would be necessary for deformation of the rigid expansion sections for adaptation to the conical surfaces of the expansion cone and of the undercut.

SUMMARY OF THE INVENTION

The primary object of the present invention is to provide an expansion anchor assembly assuring surface area contact of expansion parts with the conical surfaces of the expansion cone and also with the conically widened undercut of the borehole.

In accordance with the present invention, the inner and outer surfaces of the expansion parts are provided with a radius of curvature increasing from the bending location of the parts to the leading end of the expansion sleeve. At the inner surface of the expansion parts, the radius of curvature increases in the axial direction of the expansion parts corresponding to the radii of the expansion cone. In other words, the radius of curvature of the radially inner surface of the expansion parts corresponds to the radii of curvature of the expansion cone so that identical radii of the curvature of expansion parts and expansion cone are located in contact with one another when the expansion cone is completely drawn into the leading end of the expansion sleeve.

The radius of curvature of the outer surface of the expansion parts corresponds to the radii of curvature of the conically widened undercut in the borehole, so that the expansion parts and the undercut have identical radii of curvature when the expansion cone is fully drawn into the expansion sleeve. A surface area contact between the expansion parts and the expansion cone, on one hand, and between the expansion parts and the undercut, on the other hand, is achieved when the expansion cone is completely drawn into the leading end of the sleeve.

Preferably, the radius of curvature increases continuously along the axial length of the expansion parts of the expansion sleeve corresponding to the form of a cone for effecting surface area contact. This arrangement is distinguished in that it can be easily produced which is also true for the production of the expansion cone and of the undercut part of the bore hole contacted by the radially widened expansion parts.

It is preferable that the smallest radius of curvature of the expansion parts corresponds approximately to the least radius of curvature of the expansion sleeve. The diameter of the smaller end of the expansion cone is preferably equal to or slightly smaller than the diameter of the expansion sleeve opening in the region of the sleeve adjoining the bending locations and remote from the expansion parts. Accordingly, in addition to an unimpeded passage of the expansion cone into the expansion sleeve, it is achieved that the expansion cone supports the expansion parts radially along the surface area from the bending location to the free end of the expansion parts at the leading end of the sleeve when the cone is drawn into the plane of the bending locations. As a result, a large axial length of supporting contact is assured.

In a preferred arrangement, the largest radius of curvature corresponds to 1.2 to 1.6 times the smallest radius of curvature. Thus, in connection with the conical surfaces of the expansion cone and the widened undercut having the same change in the radius of curvature, a reliable support of the radially displaced expansion parts is achieved. Moreover, due to this arrangement, the axial length of the anchor rod drawn into the expansion sleeve is kept small.

It is preferable to maintain a constant wall thickness along the length of the expansion sleeve and also in its circumferential direction. Accordingly, in addition to a simple production of the expansion parts, it is assured that the expansion parts contact the conical surfaces of the expansion cone and of the undercut with the same cone angle. The expansion pressure introduced into the expansion parts from the expansion cone is uniformly transmitted to the wall surface of the undercut for distribution along the surface of the expansion parts.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is an axially extending sectional view of an expansion anchor assembly in condition for insertion into a borehole;

FIG. 2 is an enlarged sectional view taken along the line II—II in FIG. 1;

FIG. 3 is an enlarged perspective view of an expansion part shown in FIG. 1.

DETAILED DESCRIPTION OF THE INVENTION

Figure 4:
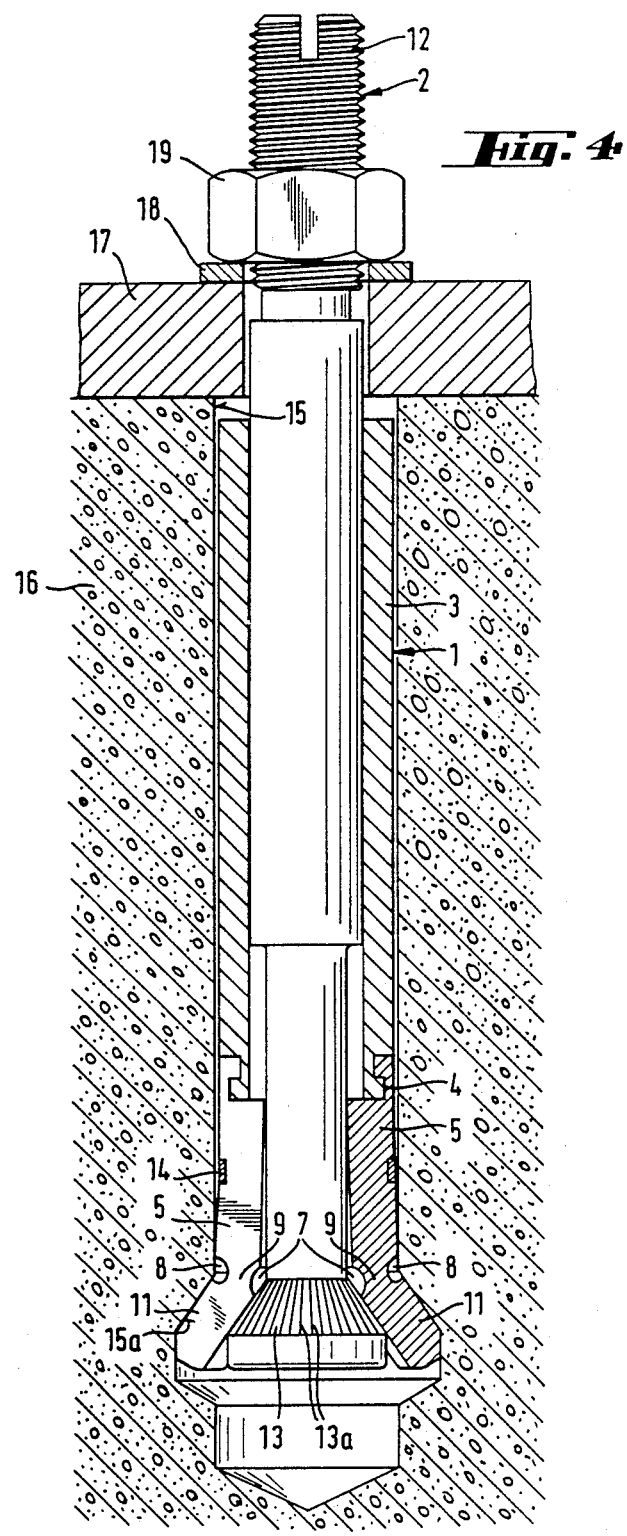
FIG. 4 an axially extending sectional view similar to FIG. 1, however, illustrating the expansion anchor assembly inserted and expanded into engaging contact with an undercut portion in a borehole.

In FIG. 1, an expansion anchor assembly is shown formed of an axially extending expansion sleeve 1 and an axially extending anchor rod 2. As viewed in FIGS. 1 and 4, the lower end of each of the sleeve 1 and the rod 2 is its first or leading end and the upper end is its second or trailing end. As can be seen in FIG. 4, the first or leading end is inserted first into the borehole. Expansion sleeve 1 has an axially extending tubular section 3 with five shell-shaped expansion sections 5 secured to it by claw connections 4. The expansion sections 5 extend axially from the tubular section 3 to the first end of the sleeve. The sections 5 are separated from one another in the circumferential direction by axially extending slots 6, note FIG. 2. Inner recesses 7 and outer recesses 8 are formed intermediate the expansion sections 5 and they extend tangentially relative to the axis of the expansion sleeve. The recesses 7 and 8 are located in a common plane with a weakened section located between them and forming a bending location 9 for shell-shaped expansion parts 11 of the expansion sections 5 extending axially from the bending locations to the first end of the expansion sleeve. The expansion sections 5 can be held together radially on the leading end of the tubular section 3 by known means, such as a spring ring 14.

At its second end, anchor rod 2 has an axially extending external thread 12 for applying a load. The anchor rod 2 extends through the expansion sleeve 1 and has an expansion cone 13 formed at its first end extending axially outwardly from the first end of the expansion sleeve, as shown in FIG. 1. Expansion cone 13 can be drawn into the first end of the expansion sleeve 1 in the axially extending region of the expansion parts 11. The expansion cone is provided in its conical surface with axially extending notches 13a.

The expansion parts 11 have a constant wall thickness in the axial and circumferential directions. The concave inner surfaces of the expansion parts 11 have a radius of curvature increasing from the bending location 9 to the first end of the expansion sleeve. Accordingly, at the radially inner surface of the expansion parts, as shown in FIGS. 2 and 3, the radius of curvature $r_1$ adjacent to the bending locations 9 increases to a larger radius of curvature $r_2$ at the free end of the expansion parts 11 forming the first end of the expansion sleeve 1. The smallest radius of curvature $r_1$, corresponds approximately to the radius of curvature of the axially extending opening through the expansion sleeve 1 in the region of the recesses 7, 8. This smallest radius of curvature $r_1$ also corresponds approximately to the smallest radius of curvature at the junction between the expansion cone and the cylindrical surface of the anchor rod. The greatest radius of curvature $r_2$ corresponds to the radius of curvature at the larger diameter end of the expansion cone 13, that is at the first end of the anchor rod 2. At its radially outer surfaces, the expansion parts 11 have the smallest radius of curvature $R_1$ adjacent to the bending location 9 or the recess 8, which corresponds to the outer radius of curvature of the expansion sections 5 on the opposite side of the recess 8 from the expansion parts 11. The outer radius of curvature $R_2$ at the free ends of the expansion parts 11 is greater than the greatest radius of curvature $r_2$ at the inner surface of the parts by their wall thickness. The centers of rotation of the radii of curvature $r_1$, $r_2$, $R_1$, $R_2$ are located on an axis of rotation inclined relative to the expansion sleeve axis at half the cone angle of the expansion cone 13, note FIG. 3. The increase of the inner and outer radii of curvature $r_1/r_2$, $R_1/R_2$ is in the range of 1.2 to 1.6 times the smallest radius of curvature $r_1$, $R_1$.

In the condition of expansion anchor assembly for insertion into a borehole, as shown in FIG. 1, the expansion parts 11 contact the anchor rod 2 radially at the inside of the bending location 9 to the free end of the expansion part only in line contact, since the inner radius of curvature $r_1$ of the expansion parts 11 increases to the radius of curvature $r_2$ relative to the radius of curvature of the anchor rod 2, note FIG. 2.

In use, the expansion anchor assembly is inserted into a borehole 15, note FIG. 4, in the original condition, as shown in FIG. 1. The borehole 15 has a widened portion or undercut 15a close to the borehole base. The axially extending surface of the borehole within the undercut 15a, diverges toward the base of the borehole. The borehole 15 is formed in a receiving material, such as a concrete structural component part 16 to which a part 17 is to be secured.

The expansion anchor assembly is inserted into the borehole so that the expansion parts 11 are located in the axial range of the undercut 15a.

After the anchor rod assembly is inserted into the borehole 15, it is secured or anchored by displacing the anchor rod 2 relative to the expansion sleeve 1 in the direction of the borehole. As a result, the expansion cone 13 is drawn into the leading end of the expansion sleeve 1 in the region of the expansion parts 11 located in the axial range of the undercut 15a and deflects the expansion parts radially outwardly. The expansion parts 11 are deflected or bent outwardly about the bending locations 9 and move into contact with the surface of the borehole within the undercut. In this position, expansion cone 13 prevents the expansion parts 11 from swinging back into their original position.

In the position of the expansion cone 13 drawn into the expansion sleeve 1, the smallest inner radius of curvature $r_1$ contacts the smaller diameter end of the expansion cone which has the same radius of curvature. The largest inner radius of curvature $r_2$ contacts the larger diameter end of the expansion cone which has a similar radius of curvature. At the same time, the outer radii of curvature $R_1$, $R_2$ contact the conically shaped surface of the undercut 15a which have the same radii of curvature so that within the axial region of the undercut, the surfaces of the expansion parts 11 are in full surface contact with the expansion cone 13 and the conical surfaces of the undercut 15a. As a result, there is no force required beyond the force needed for deflecting the expansion parts 11 to achieve the desired surface-area contact.

With the expansion anchor assembly anchored within the borehole, a part 17 is secured to the surface of the component part 16 by a washer 18 and a nut 19. During this operation, the anchor rod 2 must be prevented from rotating to obtain the desired connection. As the nut 19 is screwed onto the thread 12 on the anchor rod 2 and presses the washer 18 and the part 17 against the surface of the component part 16, the longitudinal notches 13a in the conical surface of the expansion cone 13 dig into the radially inner surface of the expansion parts 11, so that rotation of the anchor rod relative to the expansion sleeve is prevented.

While specific embodiments of the invention have been shown and described in detail to illustrate the application of the inventive principles, it will be understood that the invention may be embodied otherwise without departing from such principles.

I claim:

1. Expansion anchor assembly to be secured in a borehole formed in a receiving material comprises an axially extending expansion sleeve and an axially extending anchor rod arranged to extend through said anchor sleeve, said expansion sleeve and anchor rod each have a first end and a second end spaced axially apart, said anchor rod has an expansion cone at the first end thereof, said expansion sleeve includes axially extending expansion parts extending from the first end thereof toward the second end, said expansion parts being separated by axially extending slots, said expansion parts being radially outwardly deflectable by drawing said expansion cone on said anchor rod into the first end of said expansion sleeve between said expansion parts, each of said expansion parts having a bending location spaced axially from the first end of said expansion sleeve and being deflectable about said bending location, wherein the improvement comprises that said expansion parts comprise radially inner surfaces and oppositely directed radially outer surfaces, and said expansion parts having a first radius for said inner surfaces and a second radius for said outer surfaces and said first and second radii increasing from said bending location to the first end of said expansion sleeve, said expansion parts have a constant wall thickness in the axial and circumferential directions thereof, and the centers of the first and second radii are located along an axis extending angularly relative to the axis of said expansion sleeve with the angle between the center of said radii and the axis of said expansion sleeve being approximately one-half of the cone angle of said expansion cone.

2. Expansion anchor assembly, as set forth in claim 1, wherein said bending locations extend circumferentially and transversely of the expansion sleeve axis.

3. Expansion anchor assembly, as set forth in claim 1, wherein said first and second radii increase continuously in the axial direction of said expansion parts.

4. Expansion anchor assembly, as set forth in claim 3, wherein said first radius has a smallest radius corresponding to the radius of the inner surface of said expansion sleeve adjacent said bending location and on the opposite side of said bending location from said expansion part, and said second radius has the smallest radius of curvature corresponding approximately to the radius of curvature of the outer surface of said expansion sleeve adjacent to and on the opposite side of said bending location from said expansion part.

5. Expansion anchor assembly, as set forth in claim 4, wherein the greatest radius of curvature of said first radius and said second radius is in the range of 1.2 to 1.6 times the smallest radius of said first and second radii.

6. Expansion anchor assembly, as set forth in claim 1, wherein said bending location being located between an inner recess in said expansion sleeve and an outer recess in said expansion sleeve and said inner and outer recesses extending tangentially relative to the expansion sleeve axis.

7. Expansion anchor assembly, as set forth in claim 1, wherein said expansion sleeve comprises a tubular portion and a plurality of separate expansion sections extending from said tubular section to the first end of said expansion sleeve and said expansion parts forming an axially extending part of said expansion sections.

8. Expansion anchor assembly, as set forth in claim 7, wherein said bending location is located between an inner circumferentially extending recess and an outer circumferentially extending recess in said expansion sections intermediate spaced ends of said expansion sections.

9. Expansion anchor assembly, as set forth in claim 8, wherein said expansion sections are connected to said tubular portion by claw connections.

* * * * *